United States Patent [19]
Shiba

[11] Patent Number: 6,088,063
[45] Date of Patent: Jul. 11, 2000

[54] DATA ENCODING METHOD AND APPARATUS FOR OUTPUTTING ENCODED DATA AT A DESIGNATED TIME

[75] Inventor: Kosuke Shiba, Kyoto, Japan

[73] Assignee: Rohm Co., Ltd., Kyoto, Japan

[21] Appl. No.: 08/790,898

[22] Filed: Jan. 29, 1997

[30] Foreign Application Priority Data

Feb. 2, 1996 [JP] Japan ................................ 8-017370

[51] Int. Cl.$^7$ ...................................................... H04N 7/12
[52] U.S. Cl. ........................... 348/515; 348/512; 348/518; 348/500; 348/423; 348/568; 348/845; 370/509
[58] Field of Search ................................ 348/518, 423, 348/512, 515, 558, 568, 845, 845.1, 845.2, 845.3, 500; 370/509; 375/354, 372; H04N 7/12

[56] References Cited

U.S. PATENT DOCUMENTS

| | | | |
|---|---|---|---|
| 5,396,497 | 3/1995 | Veltman | 348/423 |
| 5,467,137 | 11/1995 | Zdepski | 348/423 |
| 5,473,385 | 12/1995 | Leske | 348/500 |
| 5,537,148 | 7/1996 | Fujinami | 348/473 |
| 5,588,029 | 12/1996 | Maturi et al. | 370/509 |
| 5,598,352 | 1/1997 | Rosenau et al. | 348/423 |
| 5,661,728 | 8/1997 | Finotello et al. | 348/423 |
| 5,668,601 | 9/1997 | Okada et al. | 348/423 |
| 5,684,804 | 11/1997 | Baronetti et al. | 370/509 |
| 5,726,989 | 3/1998 | Dokic | 348/423 |
| 5,761,437 | 6/1998 | Takano et al. | 348/423 |
| 5,771,075 | 6/1998 | Rim et al. | 348/512 |
| 5,784,119 | 7/1998 | Noda et al. | 348/512 |

*Primary Examiner*—John K. Peng
*Assistant Examiner*—Jean W. Désir
*Attorney, Agent, or Firm*—Fish & Richardson, PC

[57] ABSTRACT

There occurs an output timing lag between audio and video, for example, in case of building a system. Excessive frame skipping, etc. occurs. Prior to comparing a PTS and an SCR of MPEG within an apparatus, an offset value is added to the value of PTS. A minus offset value is used for a fast decode process. Offset values are written into an audio offset value register etc. by a host CPU. A value obtained by adding PTS and an offset value and an internal clock SSC depending on an SCR are compared by an adder-subtracter. If comparison shows the decode process is still fast, a decision controller instructs, for example, display of the same frame twice.

19 Claims, 6 Drawing Sheets

DATA ENCODING METHOD AND APPARATUS FOR OUTPUTTING ENCODED DATA AT A DESIGNATED TIME

DETAILED DESCRIPTION OF THE INVENTION

1. Field of the Invention

This invention relates to an apparatus for decoding encoded data and outputting the decoded data at a designated output time included in the data. This invention may be applied, for example, to an MPEG decoder.

2. Description of the Prior Art

Technologies for compressing video and audio into codes and storing them into various record media such as a CD-ROM and a DAT have become popular; representative by the international encoding standards, MPEG. Today home appliance manufacturers and computer manufacturers are making efforts at developing multimedia information home appliances and intending to market goods which meet MPEG. The following is a brief description of the decode operation based on MPEG.

With MPEG video and audio are separately encoded. Therefore, information of an SCR (System Clock Reference) given to each pack and a PTS (Presentation Time Stamp) given to each packet is used for synchronization when decoding.

Figure 1:
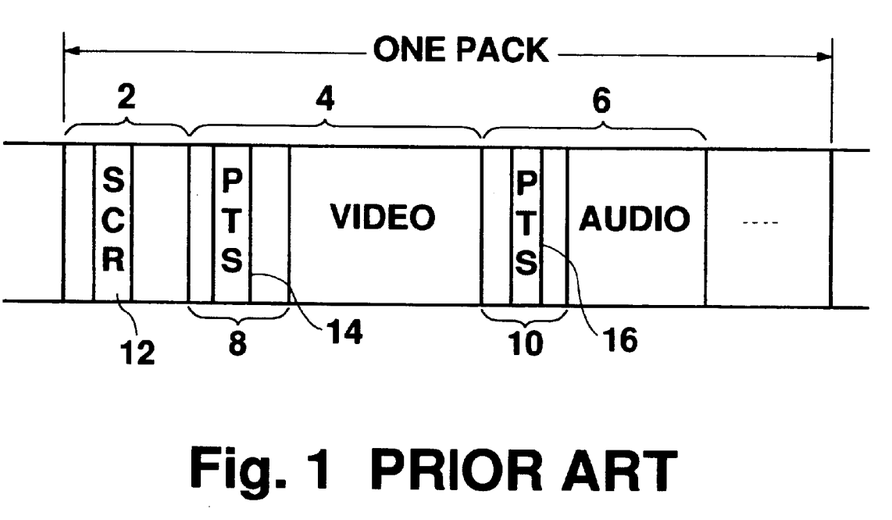
FIG. 1 is a diagram showing the composition of one pack of encoded data on MPEG.

FIG. 1 is a diagram showing the composition of one pack of encoded data on MPEG. A pack is one unit of encoded data; and is comprised of a header 2 storing information on the pack, a video packet 4 storing encoded video data, and an audio packet 6 storing encoded audio data. The header 2 stores an SCR 12.

The video packet 4 and audio packet 6 have respective headers 8 and 10, which store respective PTSs 14 and 16. The video packet 4 stores a GOP (Group Of Pictures), etc. A GOP is a random access unit in MPEG. One pack usually has more than one video packet 4 and audio packet 6. Image and audio packets are segregated and then stored into a Bit Stream (BS) buffer. The BS buffer is a FIFO temporary buffer to temporarily store encoded input data. An MPEG decoder uses this buffer with separate video and audio areas.

The SCR 12 may be considered a system time transmitted from an encoder to a decoder. Specifically, it is a read value of an internal clock in the encoder. A 90 KHz standard clock is usually used as the internal clock and counted with a 33-bit counter. As a result, time of about one day can be represented in about ten microseconds. A decoder also has an internal clock (hereinafter referred to as "SSC" (System Synchronous Clock)). SSC are also generated with a 90 KHz standard clock and a 33-bit counter. This counter is presettable, so a desired value can be loaded.

The PTSs 14 and 16 each are designated output times for displaying or outputting (hereinafter, simply "outputting") decoded packets. A designated output time is determined for a decoder by an encoder at the time of encoding. For example, if the SCR 12 is T0 and the video packet 4 and audio packet 6 are to be output at the same time at t0 after the time when a decoder receives a pack, the PTSs 14 and 16 should be "T0+t0."

Methods of synchronizing video and audio output on the above idea can be broadly divided into two categories:

(1) SCR methods (hereinafter "SCR mode")

A decoder loads the SCR 12 into its SSC pack by pack and sets its internal clock each time. Images and audio are output by independently comparing the SSC and their PTSs.

(2) Audio PTS methods (hereinafter "audio PTS mode")

Even a slight audio lag gives a feeling of unnaturalness, and so audio first is output at the best timing. This timing is determined on an audio PTS, but an audio output time has a discrete value depending on a cycle of a sampling frequency (for example, 32 KHz with MPEG 1). There therefore exists a slight lag between an actual output time and an audio PTS. At the moment audio is output, an SSC is corrected by loading into the SSC the audio PTS which triggered this output. As a result, a video output time is set on a new SSC. An SCR is used only to set the clock at the time of the first reception. This method is recommended in ISO/IEC 11172-1 and is more common than SCR methods.

The moment the decode operation is completed, a decoder will judge the time relation described above. The decoder will wait for output if its SSC has a lower value than a PTS (PTS>SSC). However, if there is a great difference between them, a different delay process will be performed. For example, the same frame will be displayed twice. If the SSC has a higher value than a PTS (PTS<SSC), the decode operation of video etc., which should have already been output, has yet to be performed and so they are output immediately. If they greatly differ, a promotion process will be performed. For example, one frame will be skipped.

A PTS is set by an encoder, and so the following troubles may occur depending on the state of the encoder or decoder:

(1) There is a timing lag between final video output and final audio output. For example, if DSP process of decoded audio is performed, the audio will arrive later than the video at the final output stage. Depending on system configuration, conventional decoder cannot absorb such a timing lag.

(2) Delay or promotion processes are frequently performed. For example, when a decision that video decode operation is significantly slow is made, a video promotion process (skipping) will be performed. A delay/promotion process is performed in frames etc., which results in too great a change per process (for example, 1/30 second). Therefore, a delay process may be performed after the promotion process, then a promotion process may be performed and so on, a vicious circle.

SUMMARY OF THE INVENTION

In the light of solving these problems, this invention is made. Its object is to provide a data decoding apparatus which accomplishes the best output timing in consideration of system configuration, uneven decode speed, etc. and removes excessive delay/promotion processes. To accomplish this object, a data decoding apparatus according to this invention manipulates a designated output time in a certain manner.

A data decoding apparatus according to this invention for decoding encoded data and outputting the decoded data at a designated output time included therein has an input section for receiving encoded data including at least video data, a setting section for setting an auxiliary value for the designated output time, a clock section for clocking an internal time, and a compare section for comparing an internal time when data is decoded and a time that is derived from said designated output time taking into account the auxiliary value. It is intended that the phrase "at least video data" may include audio data, etc.

In this device encoded data is first input and a designated output time is extracted therefrom. The above auxiliary value is considered in conjunction with the designated output time and then the resultant time is compared to an internal time.

In one aspect of this invention, the above auxiliary value is an offset value for the designated output time and the above compare section compares an internal time when data is decoded and a time that is obtained by adding the above offset value to the above designated output time. If these two times match, a decision that the decode operation is "proper" is made; if the internal time is fast, a decision that the decode operation is "slow" is made; and if the internal time is slow, a decision that the decode operation is "fast" is made. When an apparatus decodes data slowly compared with the offset value, then the offset value should preset to a higher positive value.

In another aspect of this invention, the above auxiliary value is a permissible value range for a designated output time; and the above compare section compares an internal time when data is decoded and the designated output time with the permissible value range. If the internal time is within this range, a decision that the decode speed is "proper" is made.

Yet another aspect of this invention further includes a store section for temporarily storing encoded input data and a monitor section for detecting an amount of remaining empty areas in this store section and adjusts the above auxiliary value according to this amount. For example, "FULL" means that all areas are occupied with necessary data and, conversely, "EMPTY" means that all areas are empty. In this aspect, if a decision that the store section is FULL is made, the decode operation is considered to be slow. In this case a promotion process is performed, to a certain extent, by lowering an offset value in order to empty the FULL state of the store section.

According to the data decoding method of this invention, on the other hand, encoded data is decoded and the decoded data is output at a designated output time included therein. This method includes steps of inputting encode data including at least video data; setting an auxiliary value for the designated output time; clocking an internal time; and comparing an internal time when data is decoded and a time that is derived from said designated output time taking into account the auxiliary value.

In this configuration encoded data is input first and then a designated output time is extracted from the data. A auxiliary value is taken into consideration with regard to the designated output time and then an obtained time is compared to an internal time. This comparison enables control of a decode process in various ways. For example, if the decode process of video data is slow, it can be promoted.

DESCRIPTION OF THE PREFERRED EMBODIMENTS

A preferred embodiment of this invention will be described below, while referring to the drawings.

[1] Configuration

Figure 2:
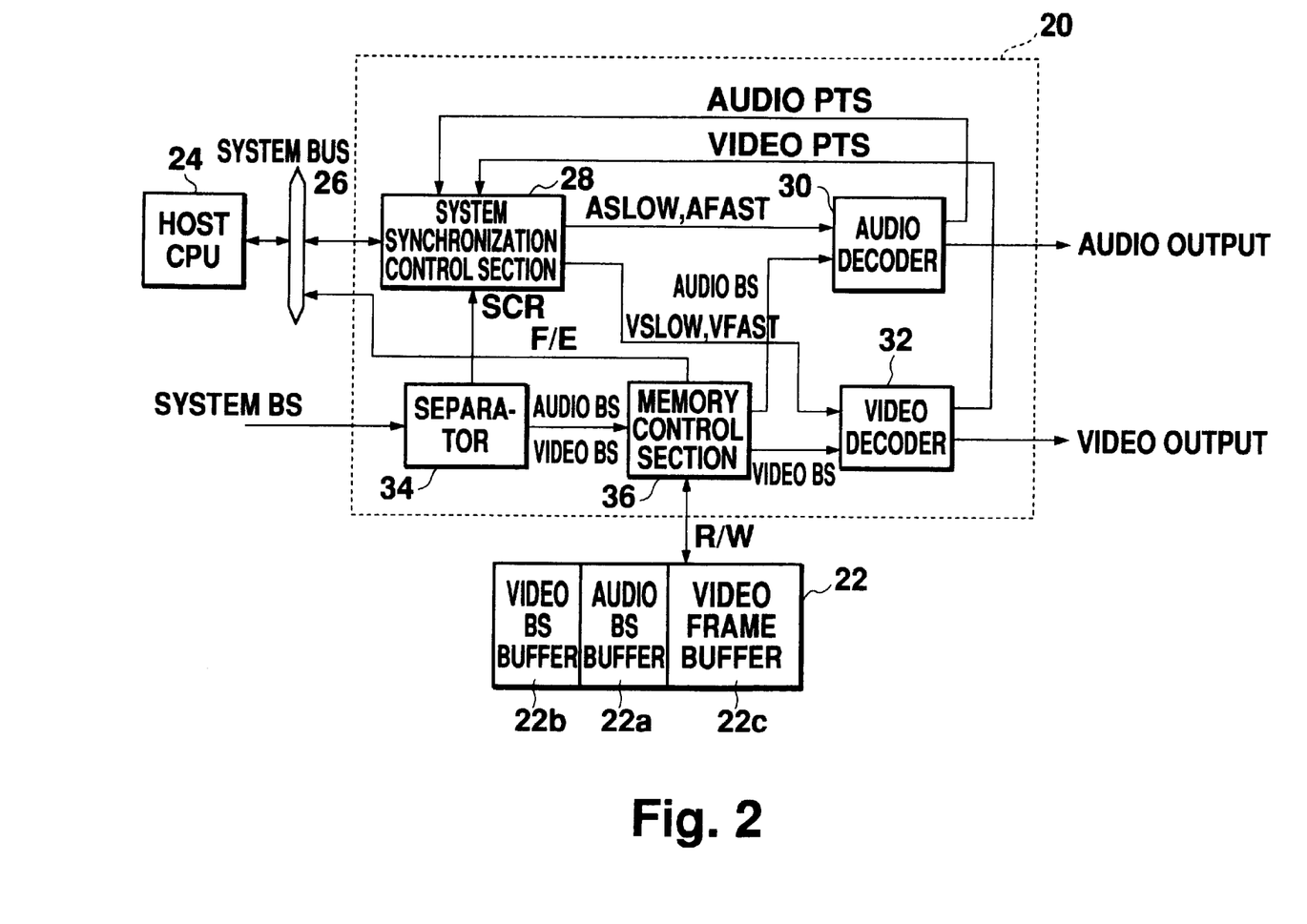
FIG. 2 is a diagram showing the entire configuration of a data decoding apparatus of a preferred embodiment.

FIG. 2 is a diagram showing the complete configuration of a data decoding apparatus of the preferred embodiment. This apparatus is an MPEG decoder the components of which are broadly divided into a decode process circuit 20, a buffer 22, and a host CPU 24 for controlling them. The entire decode process circuit 20 may be integrated into one LSI.

As shown in FIG. 2, the decode process circuit 20 is connected to the host CPU 24 through a system bus 26. This bus includes addresses, data, and control signals such as necessary commands. The decode process circuit 20 is mainly comprised of system synchronization control section 28 for synchronizing audio and video, audio decoder 30 for decoding audio, video decoder 32 for decoding video, separator 34 for separating audio from video among encoded input data (system BSs (bit streams)), and memory control section 36 for controlling write/read operation of the buffer 22. The buffer 22 is comprised of audio BS buffer 22a for storing audio BSs, video BS buffer 22b for storing video BSs, and video frame buffer 22c for storing decoded video frames (I, P, and B pictures) until output. Each buffer has a predetermined capacity.

In this configuration, when system BSs are input, first the separator 34 separates audio BSs from video BSs in a known manner according to a pack format shown in FIG. 1. These are passed to the memory control section 36. At this time an SCR in a pack is also extracted and passed to the system synchronization control section 28. It is used for synchronization control.

The memory control section 36 temporarily stores audio BSs and video BSs in the buffer 22; and reads them when they must be decoded. Read audio BSs and video BSs are sent to the audio decoder 30 and video decoder 32, respectively. In addition to this read/write (R/W) control, the memory control section 36 monitors to what extent each of the audio BS buffer 22a and video BS buffer 22b are used and sends the host CPU 24 an EMPTY signal indicating that all areas in the buffer are empty, or a FULL signal indicating that all areas in the buffer are occupied. In this case, four lines are provided in total: two for audio EMPTY and FULL signals and two for video EMPTY and FULL signals (shown by F/E in FIG. 2). In order to determine EMPTY or FULL, the memory control section 36 has a flag on each read/write unit area in the audio BS buffer 22a and video BS buffer 22b which indicates whether valid data resides in that area.

The audio decoder 30 and video decoder 32 decode audio BSs and video BSs respectively; and extract an audio PTS and a video PTS respectively. Decoded video data is temporarily stored in the video frame buffer 22c through the memory control section 36 and output according to the PTS. These two PTSs are also sent to the system synchronization control section 28.

The system synchronization control section 28 monitors and determines the output timing of decoded data with two PTSs and an SCR. An offset value or a margin value described below is used for decision. As a result of a decision, an "AFAST (Audio Fast)" or "ASLOW (Audio Slow)" signal is output to the audio decoder 30 in response to audio decode timing. Similarly, a "VFAST (Video Fast)" or "VSLOW (Video Slow)" signal is output to the video decoder 32. The two decoders perform a promotion or delay process for decode operation according to these timing indication signals. In the simplest case, the same frame (picture) is output twice when a "VFAST" signal is activated and one frame is skipped when a "VSLOW" signal is activated. With audio, one sample is output twice or skipped. However, in the audio PTS mode a process for audio is not performed in principle.

[2] Configuration of the System Synchronization Control Section 28

Figure 3:
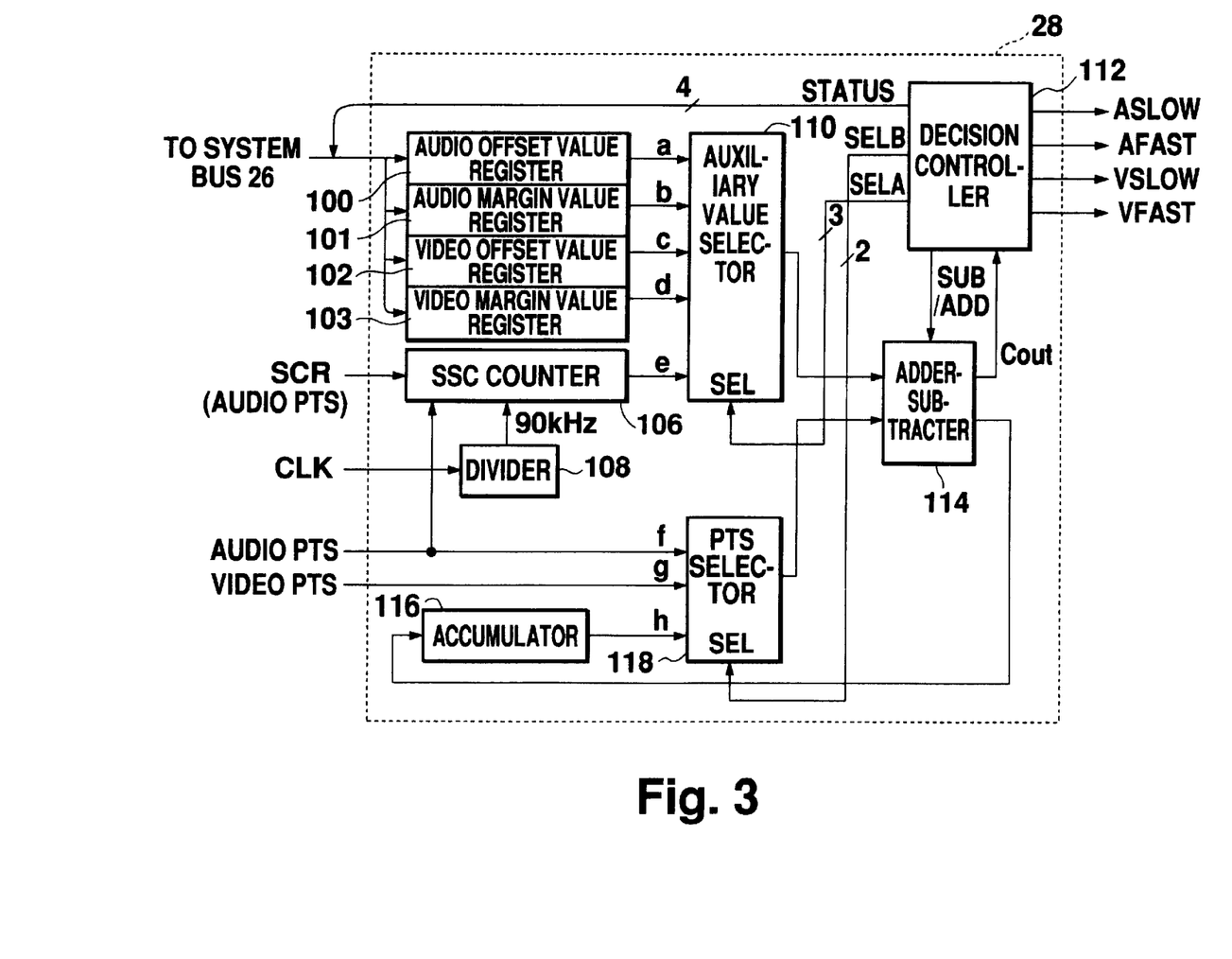
FIG. 3 is a diagram showing the detailed configuration of the system synchronization control section 28 of a preferred embodiment.

FIG. 3 is a diagram showing the detailed configuration of the system synchronization control section 28. Four 33-bit registers are connected to the system bus 26: an audio offset value register 100, an audio margin value register 101, a video offset value register 102, and a video margin value register 103. These registers hold auxiliary values used at the time of the decision of audio or video timing. These values are written by the host CPU 24. An offset value is a value to be added to a PTS when timing is judged by comparing the PTS and an SSC. Specifically, the value of (PTS+offset) is compared to an SSC. A margin value is a permissible value. Specifically, the value of (PTS±margin) is compared to an SSC. However, in the audio PTS mode the audio offset value register 100 and audio margin value register 101 are unnecessary. When the decode process circuit 20 is integrated into one LSI; in order to make the audio PTS mode and the SCR mode selectable, a configuration in which the entire audio timing decision part of a decode process circuit having all of the four registers can be invalidated (disabled) may be adopted.

An SSC counter 106 is a 33-bit presettable (having a capability of loading a value at the time of count start) up-counter and loaded with an SCR (in the SCR mode) or an audio PTS (in the audio PTS mode) as necessary. A divider 108 divides a system clock CLK to generate 90 KHz and the SSC counter 106 counts this 90-KHz clock.

A auxiliary value selector 110 selects one value from the values of the four registers 100–103 and the SSC counter 106 and outputs it to an adder-subtracter 114 according to a SELA signal (three bits) by which a decision controller 112 described below indicates which value to select. An output of the adder-subtracter 114 is held in a 34-bit accumulator 116 and sent as a Cout signal to the decision controller 112 when a carry is generated. The accumulator 116 is used to temporarily save an intermediate result of calculation at the time of add-subtract.

Similarly, a PTS selector 118 selects one of an audio PTS, a video PTS, and a value of the accumulator 116 and outputs it to the adder-subtracter 114 according to a SELB signal (two bits) by which the decision controller 112 indicates which value to select.

In order to compare the sum of a PTS and a auxiliary value to an SSC, the decision controller 112 selects a register value with a SELA signal and a PTS with an SELB signal according to the procedures described below. The values necessary for calculation have been input to the adder-subtracter 114. Then an instruction on add or subtract (SUB/ADD) will be given to the adder-subtracter 114. The decision controller 112 outputs the four decision result signals, such as ASLOW, in response to the Cout signal. These four signals are not only sent to the audio decoder 30 and video decoder 32, but also read as a STATUS signal (four bits) from the host CPU 24. The host CPU 24 monitors the status of a STATUS signal by polling and automatically adjusts the values of the registers 100–103 according to the method described below.

[3] Timing Decision on a Decode Process

Here timing decision with a auxiliary value (offset value or margin value) as well as timing decision considering other conditions will be described.

Figure 4:
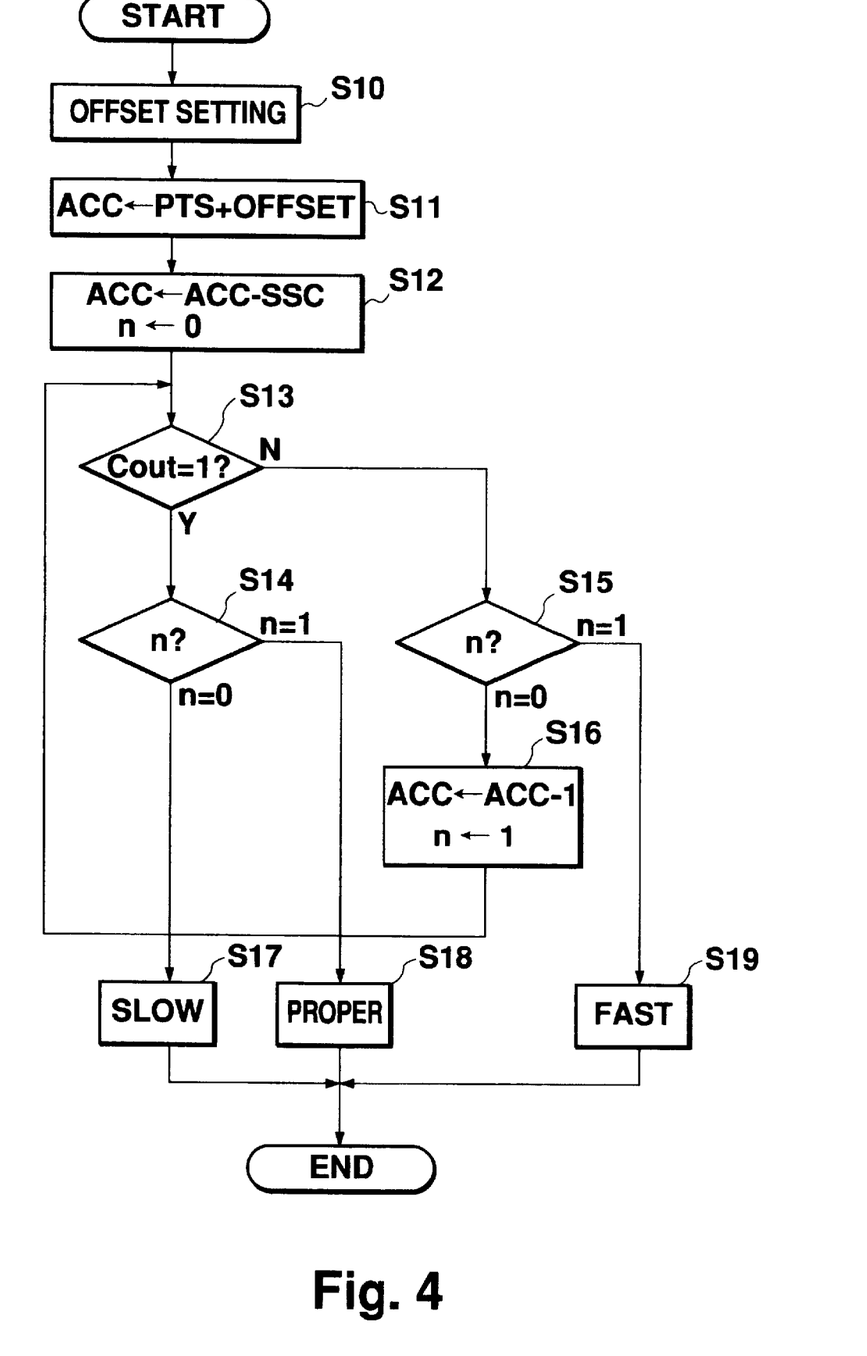
FIG. 4 is a flowchart showing decision procedures on decode timing with an offset value set.

(1) Decision by Setting an Offset Value With this method, if the value of (PTS+offset) matches an SSC, a decision that a decode process is "proper" is made. FIG. 4 is a flowchart showing decision procedures on decode timing with an offset value set. In FIG. 4, an offset value is represented by OFFSET and a value held in the accumulator 116, by ACC.

As shown in FIG. 4, first OFFSET is set (S10). If the N reason why offset setting is necessary lies in a problem specific to an apparatus, such as audio decode process being fast and if a set value is previously known, when power is applied to the apparatus, the host CPU 24 may automatically resister the offset value stored in ROM etc. A setting may become necessary later according to system configuration. A DIP switch, for example, may be attached so that a system builder, technical support person, etc. can set an appropriate value after shipment of the apparatus. In this case, a set value of a switch may be read when power is applied to the apparatus. This value may be treated as OFFSET. An offset value should be positive with a slow decode process and negative with a fast decode process.

Next, PTS and OFFSET are added and their sum is stored in ACC (S11). As to audio, for example, in FIG. 3 the auxiliary value selector 110 selects an input a, the PTS selector 118 selects an input f, and the adder-subtracter 114 is instructed to perform add. As a result a desired value is stored in ACC. Then SSC is subtracted from ACC and the result is stored in ACC (S12). These processes are equal to the following calculation:

$$PTS+OFFSET-SSC \qquad \text{(Formula 1)}$$

In practice, an input e is selected by the auxiliary value selector 110, an input h is selected by the PTS selector 118, and the adder-subtracter 114 is instructed to perform subtract. And n which will be later used as an index must be cleared to zero.

Here the value of a Cout signal is checked by the decision controller 112 (S13) and the following branch processes are performed:

1. "Proper" Decode Timing

The value of the Formula 1 equals zero, and so a carry is not generated. The value of the Cout signal is still zero. A process proceeds from N of S13 to S15; and proceeds to S16 because n=0. Here one is subtracted from ACC, one is given to n, and the process returns to S13. ACC was zero immediately before one is subtracted from it. Therefore, ACC becomes minus one when S16 ends; the Cout signal value changes to one; and the process proceeds from Y of S13 to S14. Here n is one and the process proceeds to S18, resulting in a decision "proper decode timing."

2. "Slow" Decode Timing

Formula 1 gives a minus value, so a process proceeds from S13 to S14. n equals zero, and so the process proceeds to S17, resulting in a decision "slow decode timing."

3. "Fast" decode timing

Formula 1 gives a plus value and the value of the Cout signal is still zero. A process proceeds to S15 and S16. Even if one is subtracted from ACC at S16, its value does not become minus because its original value is plus. As a result, the process returns to S13 and then proceeds to S15 again. This time n equals one, and so the process proceeds to S19, resulting in a decision "fast decode timing."

When the decision procedures are completed in this manner, a necessary promotion/delay process may be performed.

A decision method with an offset value described above can effectively cope with various cases. These cases include one where the decode timing of an apparatus is fast and one where, after the output of audio and video by an apparatus, a timing lag occurs by processing one of the two signals. In the former case excessive delay processes can be avoided by setting a minus offset value within the maximum permissible limit of a system. In the latter case, a timing lag occurring by a process unrelated to decode can be correctly absorbed.

(2) Decision by Setting a Margin Value

Next, a decision method with a margin value will be described below. With this method, if (PTS−margin value) <SSC<(PTS+margin value), a decision that a decode process is "proper" is made. Its merit is that, because some maximum permissible limit can be set, cases where a decision that a decode process is "proper" is made will be more than method (1). For example, if a delay/promotion process is performed in frames, alternate occurrence of delay and promotion processes can be avoided by considering a change per process (for example, 1/30 second) as a margin value.

Figure 5:
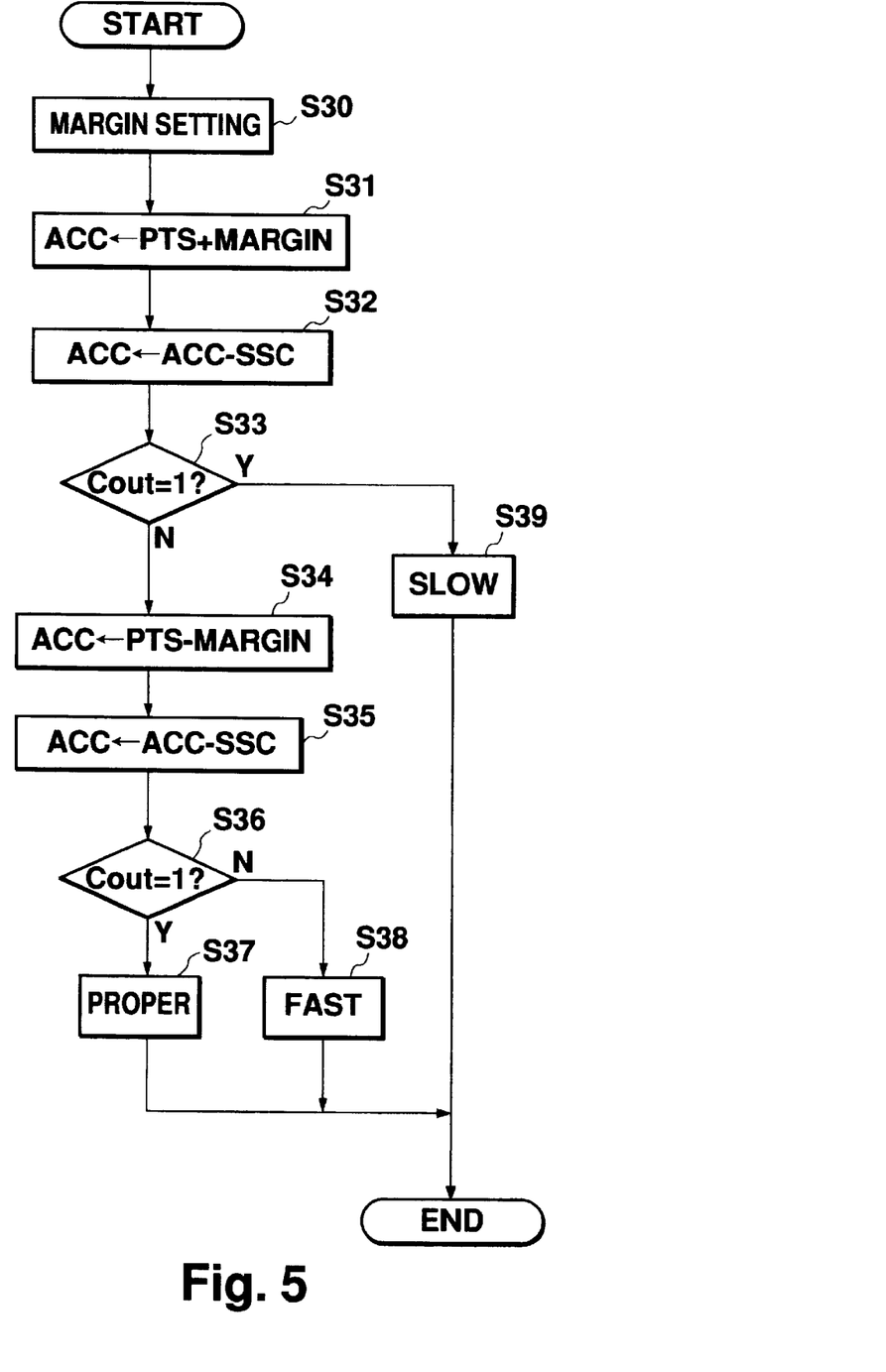
FIG. 5 is a flowchart showing decision procedures on decode timing with a margin value set.

FIG. 5 is a flowchart showing decision procedures on decode timing with a margin value set. In FIG. 5, a margin value is represented by MARGIN. Mainly, the differences between the processes of FIG. 4 and FIG. 5 will be described.

As shown in FIG. 5, first MARGIN is set (S30). PTS and MARGIN are added and their sum is stored in ACC (S31). Next, SSC is subtracted from ACC and the result is stored in ACC (S32). These processes are equal to the following calculation:

$$PTS-MARGIN-SSC \quad \text{(Formula 2)}$$

Here the value of a Cout signal is checked by the decision controller 112 (S33) and the following branch processes are performed.

1. "Proper" Decode Timing

If decode timing is "proper," there exists a relation: PTS+MARGIN>SSC and the value of the Formula 2 is positive. Therefore, a process proceeds from N of S33 to S34. The value of PTS−MARGIN is then stored in ACC and SSC is subtracted from this value (S35). In this case there exists a relation: PTS−MARGIN <SSC, so the value of the Cout signal becomes one and the process proceeds to Y of S36, resulting in a decision "proper decode timing."

2. "Slow" Decode Timing

Formula 2 gives a negative value, so a process proceeds from S33 to S39, resulting in a decision "slow decode timing."

3. "Fast" Decode Timing

There exists a relation: PTS+MARGIN>SSC, so a process proceeds to S35, as with "proper decode timing." In this case the value obtained by subtracting a margin value from PTS is higher than SSC, and so PTS−MARGIN>SSC and the value of a Cout signal is still zero. The process proceeds to S38, resulting in a decision "fast decode timing."

(3) Decision by Setting Both an Offset Value and a Margin Value.

Next, a method which combines an offset and a margin will be described. The method (3) has the effects of both of the methods (1) and (2).

Figure 6:
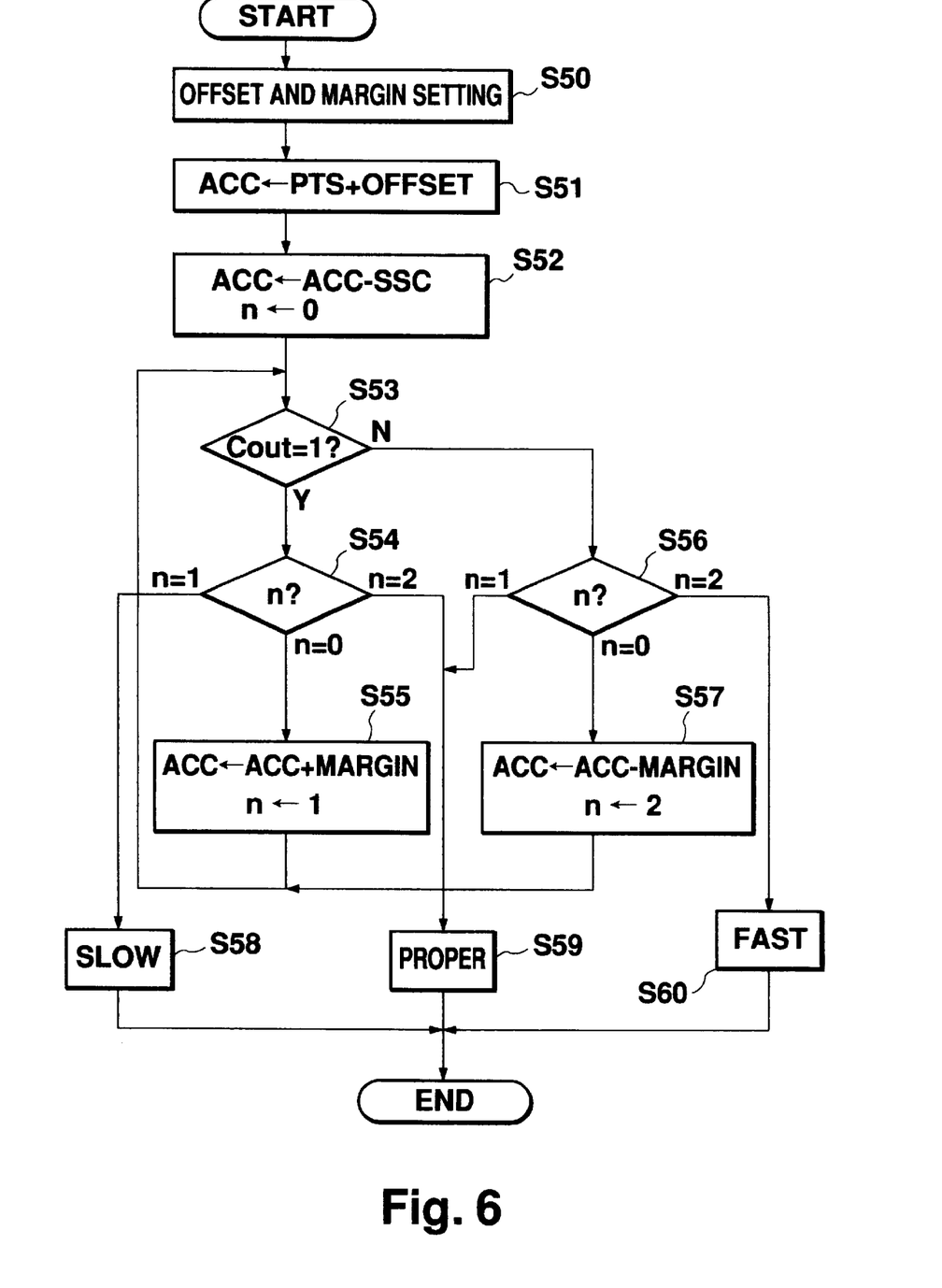
FIG. 6 is a flowchart showing decision procedures on decode timing with an offset value and a margin value set.

FIG. 6 is a flowchart showing decision procedures on decode timing with an offset value and a margin value set. Mainly, the differences between the processes of FIG. 6 and FIGS. 4 and 5 will be described.

As shown in FIG. 6, first OFFSET and MARGIN are set (S50). PTS and OFFSET are added and their sum is stored in ACC (S51). Then processes at S52 and 53 are the same as the ones at S12 and 13 of FIG. 4 according to the value of a Cout signal, the following branch processes are performed.

1. "Proper" Decode Timing

In case of "proper" decode timing, if the Cout signal value is one, adding MARGIN to PTS must change this value to zero. If the Cout signal value is zero, subtracting MARGIN from PTS must change this value to one. These are general rules.

If the Cout signal value is one at S53, the process proceeds to S54 and counituous to S55 because n equals zero. Here MARGIN is added to ACC and n is changed to one. At this point the value of the Cout signal is zero. The process returns to S53 and then branches to S56. Here n equals one, and so a decision "proper decode timing" is made at S59.

On the other hand, if the value of the Cout signal is zero at S53, the process proceeds to S56 and continuous to S57 because n equals zero. Here MARGIN is subtracted from ACC and n is changed to two. At this point the value of the Cout signal is one. The process returns to S53 and then proceeds to S54 this time. Here n equals two, and so a decision "proper decode timing" is made at S59 in the same manner.

2. "Slow" Decode Timing

The Cout signal value is one at S53 and a process proceeds to S54 and 55. Here the Cout signal value remains one, even after MARGIN is added to ACC. Therefore, when the process returns to S53, it proceeds again to S54. Here n equals one, and so a decision "slow decode timing" is made at S58.

3. "Fast" Decode Timing

The Cout signal value is zero at S53 and a process proceeds to S56 and 57. Here the Cout signal value remains zero, even after MARGIN is subtracted from ACC. Therefore, when the process returns to S53, it proceeds again to S56. Here n equals two, and so a decision "fast decode timing" is made at S60.

(4) Decision Method Considering Conditions Other than the Above.

In addition to (1)–(3), other conditions are considered. Here signals indicating the store status of the BS buffers 22a and 22b are used. These are F/E (FULL/EMPTY) signals output from the memory control section 36 in FIG. 2. The host CPU 24 may monitor these four signals by polling. Or interrupts etc. may be generated on the host CPU 24 according to changes in these signals. By this method, if a FULL signal is generated, a decision "slow decode timing" is made; if an EMPTY signal is generated, a decision "fast decode timing" is made; and if no signal is generated, a decision "proper decode timing" is made.

After a decision, the above register values are automatically adjusted according to the result. Note that when a FULL signal is generated ("slow decode timing"), a lower offset value must be used. By doing this, a promotion process can solve the FULL status of the BS buffers 22a and 22b soon. As a result the BS buffers 22a and 22b are kept in proper store status. Manual adjustment from outside is not necessary.

[4] Automatic Adjustment of Register Values

In this embodiment, an offset value or a margin value is automatically adjusted according to a decision result. One possible way to accomplish this is as follows. As in [3] (4), the host CPU 24 monitors by polling the four STATUS signals including AFAST and if, for example, AFAST is active some times running, an audio offset value is made lower within the maximum permissible limit of a system or an audio margin value is made higher within the maximum permissible limit of the system. The update of a corresponding register value is performed by the host CPU 24.

These are the details of an apparatus of a preferred embodiment. The following modifications or improvements of this preferred embodiment are also possible.

1. The decision controller 112 uses a Cout signal from the adder-subtracter 114 to make a decision, but a comparator may be placed behind the adder-subtracter 114. In this case, the value of SSC should be always input to one side of the comparator and PTS+OFFSET etc. obtained by add-subtract should be input to the other side by appropriately switching with a selector. This will decrease the number of decision steps.

2. Timing decision with F/E signals is performed mainly by the host CPU 24, but it may be performed by the system synchronization control section 28. In that case, the system synchronization control section 28 monitors the change in the four signals.

3. Frame skipping is taken as an example of a promotion process, but other methods may be used. For example, increasing decode speed by degrading decode accuracy is possible.

4. An MPEG decoder is described as a data decoding apparatus, but, of course, this invention applies to other apparatus which compares an internal time and a designated output time.

According to this embodiment, a data decoding apparatus which accomplishes the best output timing in consideration of system configuration, the scatter of decode speed, etc. and removes excessive delay/promotion processes can be provided. This invention can be applied in any stages of a data decoding apparatus, including a manufacturing stage, a system building stage, or an after market stage. Furthermore, by a configuration of automatically adjusting the register values for timing decision, the best method of PTS decision can be accomplished within the maximum permissible limit of a system without any concern to users, etc. about the adjustment. While there has been described what are at present considered to be preferred embodiments of the invention, it will be understood that various modifications may be made thereto, and it is intended that the appended claims cover all such modifications as fall within the true spirit and scope of the invention.

I claim:

1. An apparatus for decoding encoded data and outputting the decoded data at a designated output time, the apparatus comprising:

an input section for receiving encoded data including at least video data;

a setting section for setting an auxiliary value for said designated output time;

a clock section for clocking an internal time;

a compare section for comparing an internal time when data is decoded and a time that is derived from said designated output time taking into account the auxiliary value; and a section for adjusting the auxiliary value based on said comparison.

2. An apparatus according to claim 1, further comprising a decode adjusting section for accelerating or delaying the decode process based on a result of said comparison.

3. An apparatus according to claim 2, wherein when the decode process of video data is fast, said decode adjusting section displays the same video frame more than once.

4. An apparatus according to claim 2, wherein, when the decode process of video data is slow, said decode adjusting section skips display of a video frame.

5. An apparatus according to claim 2, wherein when the decode process of video data is slow, said decode adjusting section degrades decode accuracy of a video frame.

6. An apparatus according to claim 1, wherein:

said auxiliary value is an offset value for the designated output time, and said compare section compares an internal time when data is decoded and a time that is obtained by adding said offset value to said designated output time.

7. An apparatus according to claim 6, wherein said offset value is based on a difference between decode speed of video data and the decode speed of data other than video.

8. An apparatus according to claim 1, wherein:

said auxiliary value is a permissible value range for a designated output time, and said compare section compares an internal time when data is decoded and the designated output time with the permissible value range.

9. An apparatus according to claim 8, wherein said permissible value range is based on a display interval of video frames.

10. An apparatus according to claim 1, further comprising:

a store section for temporarily storing encoded input data;

a section for detecting an empty capacity of the store section; and an adjusting section for adjusting said auxiliary value according to the detected empty capacity.

11. An apparatus according to claim 10, wherein when said empty capacity is limited, said adjusting section adjusts the auxiliary value such that the decode process is accelerated, and, when said empty capacity is large, said adjusting section adjusts the auxiliary value such that the decode process is delayed.

12. A method of decoding encoded data and outputting the decoded data at a designated output time, the method comprising:

inputting encoded data including at least video data;

setting an auxiliary value for said designated output time;

clocking an internal time;

comparing an internal time when data is decoded and a time that is derived from said designated output time taking into account the auxiliary value; and adjusting the auxiliary value based on said comparison.

13. A method according to claim 12, further comprising accelerating or delaying the decode process based on a result of said comparison.

14. A method according to claim 12, wherein said auxiliary value is an offset value for the designated output time, and said comparing step compares an internal time when data is decoded and a time that is obtained by adding said offset value to said designated output time.

15. A method according to claim 12, wherein said auxiliary value is a permissible value range for a designated output time, and said comparing step compares an internal time when data is decoded and the designated output time with the permissible value range.

16. An apparatus for decoding encoded data and outputting the decoded data at a designated output time, the apparatus comprising:

an input section for receiving encoded data including at least video data;

a setting section for setting an auxiliary value for said designated output time;

a clock section for clocking an internal time;

a compare section for comparing an internal time when data is decoded with a time that is derived from said designated output time taking into account the auxiliary value;

a store section for temporarily storing encoded input data;

a section for detecting an empty capacity of the store section; and an adjusting section for adjusting said auxiliary value according to the detected empty capacity.

17. An apparatus according to claim 16, wherein when the empty capacity is limited, the adjusting section adjusts the auxiliary value such that the decode process is accelerated, and, when the empty capacity is large, the adjusting section adjusts the auxiliary value such that the decode process is delayed.

18. A method of decoding encoded data and outputting the decoded data at a designated output time, the method comprising:

inputting encoded data including at least video data;

setting an auxiliary value for the designated output time;

clocking an internal time;

comparing an internal time when data is decoded with a time that is derived from the designated output time taking into account the auxiliary value;

temporarily storing encoded input data in a store section;

detecting an empty capacity of the store section; and adjusting the auxiliary value according to the detected empty capacity.

19. A method according to claim 18, wherein when the empty capacity is limited, adjusting the auxiliary value such that the decode process is accelerated, and, when the empty capacity is large, adjusting the auxiliary value such that the decode process is delayed.

* * * * *